Sept. 3, 1963  W. G. STOECKICHT  3,102,433
GEARING WITH DOUBLE HELICAL TOOTHING
Filed Oct. 26, 1961
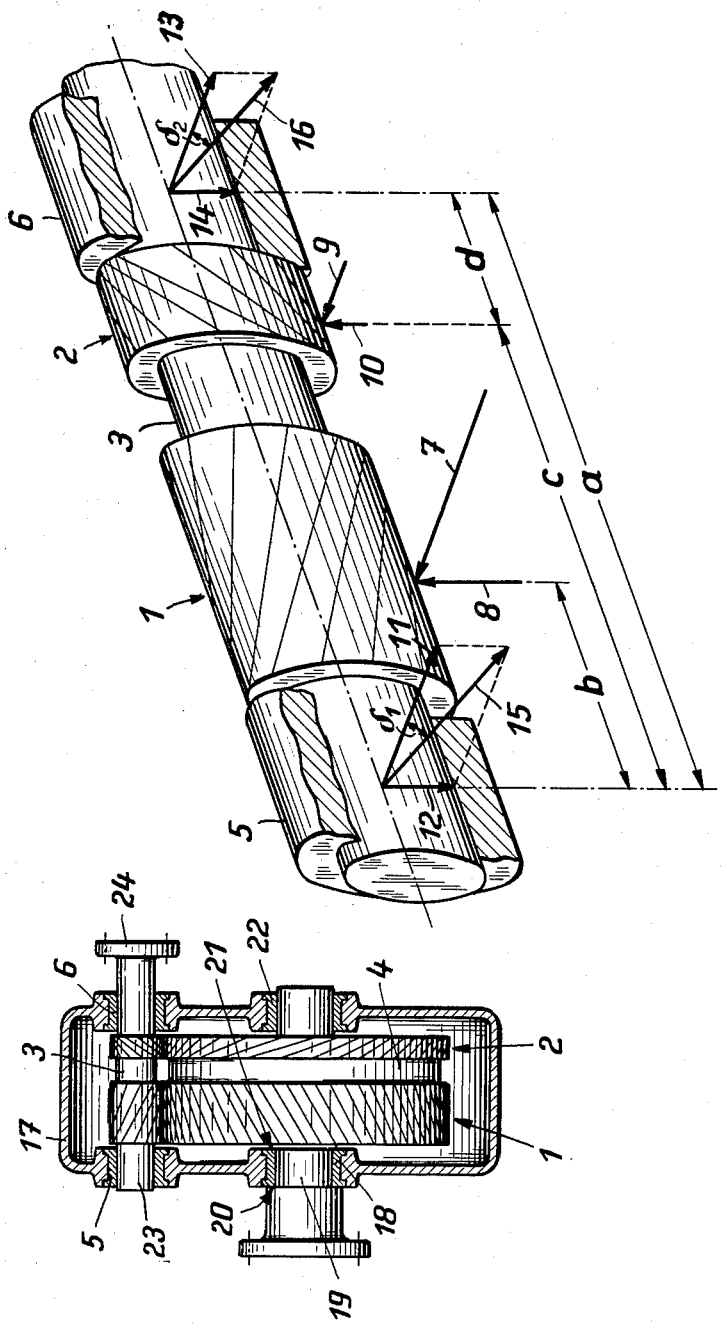
INVENTOR.
WILHELM G. STOECKICHT
BY
Harness, Dickey & Pierce
ATTORNEYS

United States Patent Office 3,102,433
Patented Sept. 3, 1963

3,102,433
GEARING WITH DOUBLE HELICAL TOOTHING
Wilhelm G. Stoeckicht, Rugendasstrasse 4,
Munich-Solln, Germany
Filed Oct. 26, 1961, Ser. No. 147,872
Claims priority, application Germany July 27, 1961
5 Claims. (Cl. 74—410)

The invention relates to a gearing with double helical toothing.

Gearings with double helical toothing have already become known in which the angles of inclination of the two helices are differently dimensioned. A proposal has been made, for instance, for the reduction of the noise of the gearing, to select the angles of inclination of the two helices to be of different dimensions. It has also become known to differently dimension the two helices in order to increase the load transferring capacity of the gearing.

Such gearings are, however, exhibiting the disadvantage that, with equal gear cutting tools being used for both the helices as is usual, i.e. with the use of equal normal pressure angles, a different ratio between the peripheral force and the radial force of the tooth will occur, for this ratio is dependent on the size of the transverse pressure angle which, in turn, with equal normal pressure angles, is dependent on the size of the angle of inclination. This difference in ratio (peripheral force to radial force of the tooth) may now lead to a slight inclination of the gears in operation, which inclination is possible only within the region included by the limits as given by the dimensioning of the bearings, it is true, that means in very narrow limits only, but may nevertheless under adverse conditions impair the bedding of the teeth.

It is therefore the object of the invention to eliminate this disadvantage.

In accordance with the invention this is achieved in that differently dimensioned normal pressure angles are selected for the toothing of the two helices such that the helix having the smaller angle of inclination is designed to have the greater normal pressure angle and the helix having the greater angle of inclination is designed to have the smaller normal pressure angle.

The drawing shows by way of example an embodiment of the invention, in which

FIGURE 1 shows a diagrammatic longitudinal sectional view of the gearing with meshing gears having asymmetric double helical toothing.

FIGURE 2 shows diagrammatically an enlarged perspective view of a pinion and bearing assembly.

FIG. 1 shows a diagrammatic longitudinal sectional view of the gearing with meshing gears having asymmetric double helical toothing, wherein two gears 4 and 3 are in mesh with one another and in which the helix 1 is provided with an angle of inclination of 30° and the other helix 2 is provided with an angle of inclination of 60°. Both gears 3, 4 are shown by way of example as being arranged within a housing 17. The shaft 19 of the gear 4 is supported in two bearings 18 and 22, one 18 of which being designed as a stationary or guide bearing in order to axially fix the gear 4, in that it is in cooperation with the shoulders 20 and 21 which are provided for this purpose on the shaft 19. The bearings 5, 6 of the shaft 23 of the gear pinion 3 are designed in such a manner as to permit axial movement of the pinion 3. The flange 24 through which the external torque is respectively transferred onto, or taken off from the gear 3, is arranged on the side of the helix 2 which is provided with the larger angle of inclination. In the embodiment shown by way of example, the toothing 1 with an angle of inclination of 30° has a normal pressure angle of 22°30′, and the toothing 2 with an angle of inclination of 60° has a normal pressure angle of 15°.

FIG. 2 shows diagrammatically an enlarged perspective view of the pinion 3 together with its two bearings 5 and 6.

In FIG. 2, there are furthermore indicated by the arrow 7, the peripheral force effective on the 30° helix 1 and, by the arrow 8, the associated radial force; in the same manner there are shown the peripheral force 9 and the radial force 10 for the 60° helix 2. For the sake of a better representation, these forces are respectively indicated by an arrow in the center of the respective tooth width. In the centers of the bearings 5 and 6, the respective reaction forces are shown which are occurring in the bearings, namely 11 for the proportion of reactive forces in the bearing 5 to the peripheral forces 7 and 9, and 12 for the proportion of reaction forces to the radial tooth forces 8 and 10; in a corresponding manner, the arrow 13 in the bearing 6 indicates the proportion of reaction forces to the peripheral forces 7 and 9, and the arrow 14 the proportion of reaction forces to the radial tooth forces 8 and 10. The resultant from the forces 11 and 12 is indicated at 15, and the resultant from the forces 13 and 14 is indicated at 16. The angle included by the resultant 15 and the direction of the peripheral forces be assumed with $\delta_1$ and the angle included by the resultant 16 and the direction of the peripheral forces with $\delta_2$.

For the purpose of carrying out an example with figures, the distance between the two bearings is assumed to be $a$, the distance of the center of the bearing 5 from the point of engagement of the peripheral force 7 is assumed with $b$, and the distance from the point of engagement of the peripheral force 9 with $c$, while the distance of the center of the bearing 6 from the point of engagement of the peripheral force 9 is assumed to be $d$.

The effect of the invention is explained as follows: The optimum arrangement is achieved when both helices have the same transverse pressure angles $\alpha_s$.

The transverse pressure angle is calculated according to the following formula:

$$\tan \alpha_s = \frac{\tan \alpha_n}{\cos \beta}$$

wherein $\alpha_s$ is the transverse pressure angle, $\alpha_n$ the normal pressure angle and $\beta$ is the inclination angle of the toothing.

Therefore, for the equality of the transverse pressure angles, the following formula will result:

$$\frac{\tan \alpha_{n1}}{\cos \beta_1} = \frac{\tan \alpha_{n2}}{\cos \beta_2}$$

wherein the figure 1 is valid for the helix 1 and the figure 2 for the helix 2. As the normal pressure angle $\alpha_{n1}$, the angle of inclination $\beta_1$, and the angle of inclination $\beta_2$ are given, the following will hold true for the normal pressure angle $\alpha_{n2}$:

$$\tan \alpha_{n2} = \tan \alpha_{n1} \frac{\cos \beta_2}{\cos \beta_1}$$

Consequently, in the optimum embodiment of the invention, the tangent values of the normal pressure angle are to be in the same relationship as the cosines of the inclination angles. It has however also been found that relatively small differences in the ratio of the tangent values of the transverse pressure angles may be neglected, namely for the following reason: The differences in the radial forces of the teeth which may be present, are effective on the position of the gear in such a manner that they may have an influence on the position of the journals of the gear shaft in its bearings, namely in that the difference in the direction of the resultant bearing forces, when they are great enough, may bring about a certain oblique positioning of the gear shaft. Because of the distribution of all the tooth forces on both the gearings, however, relatively small differences in the radial tooth forces will become effective on the direction of the resultants of the bearing forces only to such a small degree that they may practically be neglected. This may be explained by way of example with the aid of figures and having reference to FIG. 2.

Helix 1:
  Angle of inclination $\beta_1 = 30°$
  Normal pressure angle $\alpha_{n1} = 22°30'$
Helix 2:
  Angle of inclination $\beta_2 = 60°$
  Normal pressure angle $\alpha_{n2} = 15°$
Center distance of bearings: $a = 37.5$ cm.
Distance between the center of helix 1 and the center of bearing 5: $b = 13$ cm.
Distance between the center of helix 2 and the center of bearing 5: $c = 29.25$ cm.
Peripheral force $P_7$ (corresponding to arrow 7 in FIG. 2) $= 300$ kg.
Peripheral force $P_9 = 100$ kg.

Radial force $P_8 = P_7 \cdot \tan \alpha_{s1} = P_7 \dfrac{\tan \alpha_{n1}}{\cos \beta_1} = 144$ kg.

Radial force $P_{10} = P_9 \cdot \tan \alpha_{s2} = P_9 \dfrac{\tan \alpha_{n2}}{\cos \beta_2} = 54$ kg.

Reaction forces in bearing 6:

$$P_{13} = \frac{P_7 \cdot b + P_9 \cdot c}{a} = 182 \text{ kg.}$$

$$P_{14} = \frac{P_8 \cdot b + P_{10} \cdot c}{a} = 92 \text{ kg.}$$

Reaction forces in bearing 5:

$P_{11} = P_7 + P_9 - P_{13} = 218$ kg.

$P_{12} = P_8 + P_{10} - P_{14} = 106$ kg.

Angles $\delta_1$ and $\delta_2$ included by the reultants 15 and 16, respectively, and the direction of the peripheral forces:

$$\tan \delta_1 = \frac{P_{12}}{P_{11}} = 0.486; \; \delta_1 = 25°56'$$

$$\tan \delta_2 = \frac{P_{14}}{P_{13}} = 0.505; \; \delta_2 = 26°49'$$

Difference between angles: $\delta_2 - \delta_1 = 0°53'$.

This difference in the direction of the resultant bearing forces is so small that it may reasonably be neglected; for variations in this order may anyway occur during operation.

It will therefore be seen that the invention may be realized even if, for instance, because of standardized gear cutting tools having to be selected, deviations must be made from the exact balance of the normal pressure angles. Consequently, for realizing the invention, normal pressure angles especially of 14½°, 15°, 20° and 22½° may generally be employed, which are already in use also otherwise.

What I claim is:

1. In a double helical gear mechanism, a first gear section on each gear having teeth with a first inclination angle in one direction and a first normal pressure angle, a second gear section on each gear having teeth with a second inclination angle in the opposite direction and a second normal pressure angle, said second inclination angle being greater than said first inclination angle, said second normal pressure angle being smaller than said first normal pressure angle, bearing means for one of said gears including means for preventing axial movement thereof, and bearing means for the other gear permitting axial movement thereof.

2. In a double helical gear mechanism, a first gear section on each gear having teeth with a first inclination angle in one direction and a first normal pressure angle, a second gear section on each gear having teeth with a second inclination angle in the opposite direction and a second normal pressure angle, said second inclination angle being greater than said first inclination angle, said second normal pressure angle being smaller than said first normal pressure angle to such extent that the ratio of the tangent values of said normal pressure angles correspond substantially to the ratio of the cosine values of said inclination angles, bearing means for one of said gears including means for preventing axial movement thereof, and bearing means for the other gear permitting axial movement thereof.

3. In a double helical gear mechanism, a first gear section on each gear having teeth with a first inclination angle in one direction and a first normal pressure angle, a second gear section on each gear having teeth with a second inclination angle in the opposite direction and a second normal pressure angle, said second inclination angle being substantially greater than said first inclination angle to such an extent that the tangent of said second inclination angle is a multiple of the tangent of said first inclination angle, said second normal pressure angle being smaller than said first normal pressure angle to such an extent that the ratio of the tangent values of said normal pressure angles correspond substantially to the ratio of the cosine values of said inclination angles, bearing means for one of said angles including means for preventing axial movement thereof, and bearing means for the other gear permitting axial movement thereof.

4. In a double helical gear mechanism, a first gear section on each gear having teeth with a first inclination angle in one direction and a first normal pressure angle, a second gear section on each gear having teeth with a second inclination angle in the opposite direction and a second normal pressure angle, said second inclination angle being substantially greater than said first inclination angle to such an extent that the tangent of said second inclination angle is about three times greater than the tangent of said first inclination angle, said second normal pressure angle being smaller than said first normal pressure angle to such an extent that the ratio of the tangent values of said normal pressure angles correspond substantially to the ratio of the cosine values of said inclination angles, bearing means for one of said gears including means for preventing axial movement thereof, and bearing means for the other gear permitting axial movement thereof.

5. In a double helical gear mechanism as claimed in claim 4 in which said first inclination angle being less than 45° in one direction and said second inclination angle being more than 45° in the opposite direction.

References Cited in the file of this patent

UNITED STATES PATENTS

| | | |
|---|---|---|
| 1,803,295 | Bethune | Apr. 28, 1931 |
| 1,861,258 | Bethune | May 31, 1932 |
| 1,989,663 | Bethune | Feb. 5, 1935 |
| 2,067,477 | Cooper | Jan. 12, 1937 |
| 2,703,021 | Stoeckicht | Mar. 1, 1955 |
| 2,982,146 | Stoeckicht | May 2, 1961 |
| 3,011,365 | Stoeckicht | Dec. 5, 1961 |